No. 655,702. Patented Aug. 14, 1900.
F. G. FRANKENBERG.
AUTOMOBILE.
(Application filed Oct. 23, 1899.)
(No Model.) 3 Sheets—Sheet 1.

WITNESSES:
Howard A. Redfield
F. C. Jay

INVENTOR:
Frederick G. Frankenberg
BY Casper L. Redfield
ATTORNEY.

No. 655,702. Patented Aug. 14, 1900.
F. G. FRANKENBERG.
AUTOMOBILE.
(Application filed Oct. 23, 1899.)
(No Model.) 3 Sheets—Sheet 2.

No. 655,702. Patented Aug. 14, 1900.
F. G. FRANKENBERG.
AUTOMOBILE.
(Application filed Oct. 23, 1899.)
(No Model.) 3 Sheets—Sheet 3.
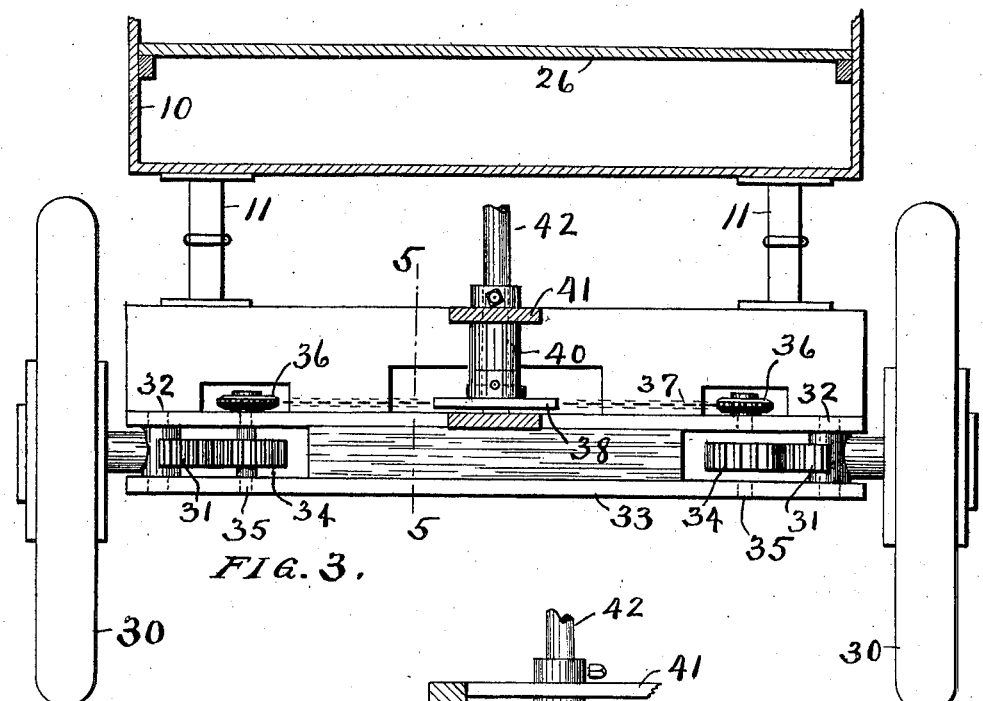
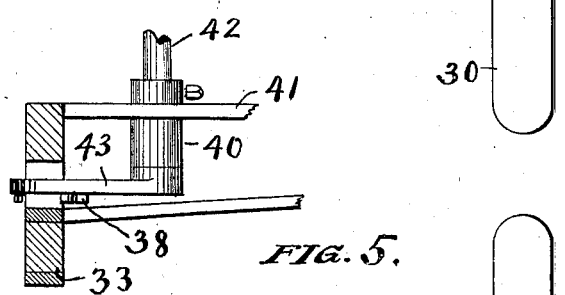
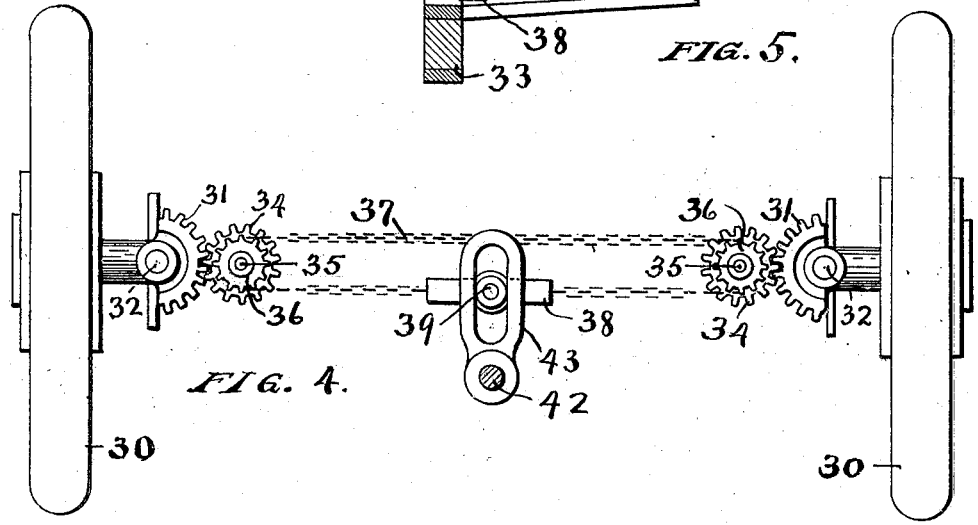
WITNESSES:
Howard A. Redfield
F. C. Jay
INVENTOR:
Frederick G. Frankenberg
BY Casper L. Redfield.
ATTORNEY.

UNITED STATES PATENT OFFICE.

FREDERICK G. FRANKENBERG, OF CHICAGO, ILLINOIS.

AUTOMOBILE.

SPECIFICATION forming part of Letters Patent No. 655,702, dated August 14, 1900.

Application filed October 23, 1899. Serial No. 734,482. (No model.)

*To all whom it may concern:*

Be it known that I, FREDERICK G. FRANKENBERG, a citizen of the United States of America, and a resident of Chicago, county of Cook, State of Illinois, have invented certain new and useful Improvements in Automobiles, of which the following is a specification.

My invention relates to automobiles, and has for its object certain improvements in the driving and steering mechanism therefor.

My invention is illustrated in the accompanying drawings, in which—

Figure 1:
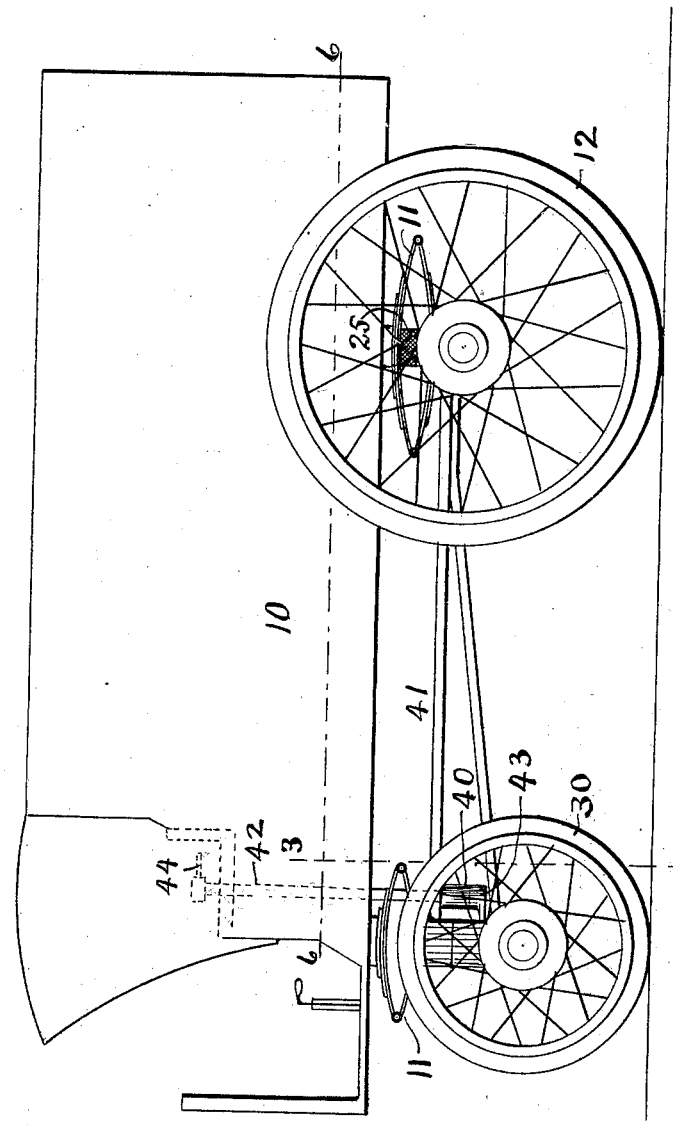
Figure 2:
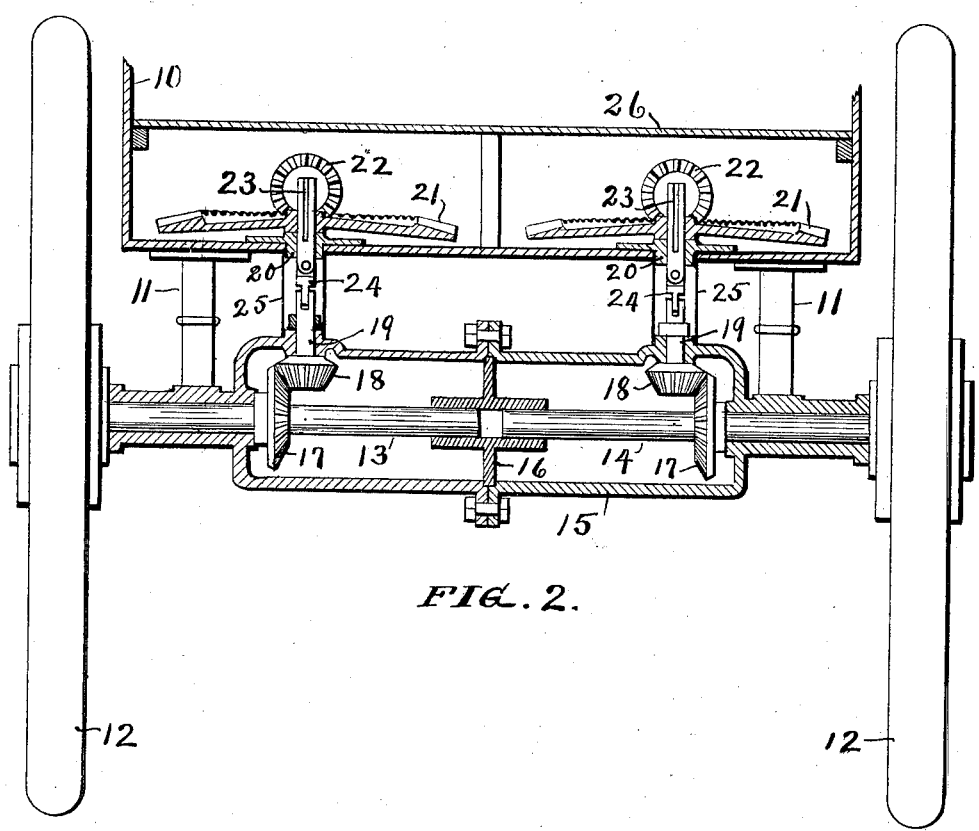
Figure 6:
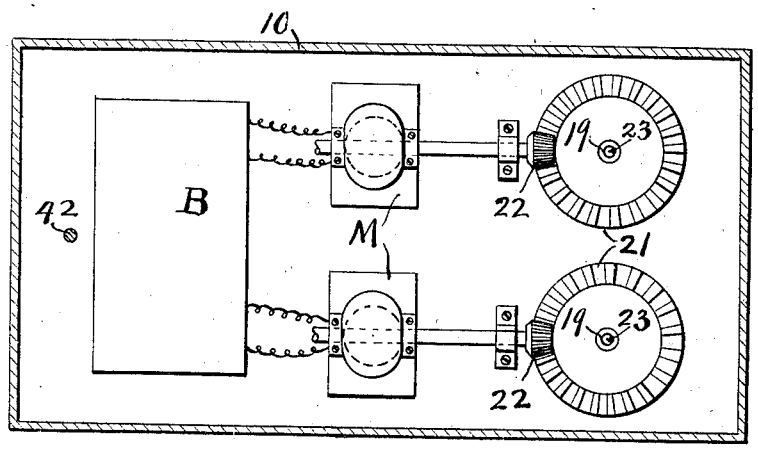

Figure 1 is a side elevation of an automobile. Fig. 2 is a vertical section on the line of the rear axle, some parts being in elevation. Fig. 3 is a vertical section on line 3 3 of Fig. 1. Fig. 4 is a plan of the steering mechanism detached. Fig. 5 is a section on line 5 5 of Fig. 3, and Fig. 6 is horizontal section on line 6 6 of Fig. 1.

In the said drawings, 10 represents the body of a vehicle mounted in the ordinary manner upon the springs 11. The rear wheels 12 are mounted upon separate axles 13 and 14, which are supported in the axle-case 15. A block 16 is supported inside of the case 15 and serves as a bearing for the ends of the axles 13 and 14. On the axles 13 and 14 are the bevel-gears 17, which mesh with the bevel-pinions 18 on the shafts 19, which extend upward through the bearings 20 in the body 10 of the vehicle. On the upper ends of the shafts 19 are the bevel-gears 21, which mesh with the pinions 22 and which are driven by the motors M. To provide for the vertical vibrations of the vehicle on the springs 11, the gears 21 are provided with feathers, which slide in the keyways 23 in the shafts 19. To compensate for lateral vibrations of the vehicle, there are universal joints 24 in the shafts 19, between the pinions 18 and the gears 21. Surrounding the shafts 19 (and the universal joints 24) between the case 15 and the bearings 20 are tubular casings 25. The casings 25 are made of wire-gauze, canvas, or some other suitably-flexible material which will accommodate itself to the vibrations of the vehicle and will exclude dirt from the shafts 19 and their bearings. Located near the motors M is a storage battery B, and across the body of the vehicle is a partition 26. It will be observed that in the construction herein described the axles 13 and 14 and the gearing thereto are inclosed by the casing 15, that the motors and gearing therefor are inclosed by a partition or a false bottom 26 of the vehicle, and that the connections between the motor-gearing and the axle-gearing are inclosed by the casings 25. The entire driving mechanism is therefore inclosed and protected. The form in which the motors and their connections are inclosed is of special advantage in vans for carrying goods, as it leaves the vehicle with a clear floor without obstructions. The form in which the axles 13 and 14 and the connecting-gearing are inclosed gives ample strength and furnishes an inclosed space for lubricant by which the working parts may be automatically lubricated. Having two motors, each of which is connected to a separate wheel, is not for steering, but for the purpose of permitting the wheels to run freely when the vehicle is turning or running in a curve. Where two wheels are rigidly connected to one axle, one wheel must slip and grind on the ground when the length of the track of one wheel is greater or less than that of the other. In the construction illustrated this difference in length of track is compensated for by variations of the speed of the motors with respect to each other.

The front wheels 30 are not supported on an axle in the ordinary manner, but on pins or trunnions extending laterally from the gear-segments 31. The segments 31 are pivoted on pins 32, secured in the front bridge 33, and mesh with gears 34, which are mounted on the vertical shafts 35, also carried on said bridge. Secured on the upper ends of the shafts 35 are the sprocket-wheels 36, which are connected together by the chain 37. Located in one branch of the chain 37 is a bar 38, provided with a pin and roller 39. Mounted in a bearing 40 on the reach 41 is a vertical shaft 42, on the lower end of which is a slotted lever 43 for engaging the pin and roller 39. The shaft 42 extends upward adjacent to the driver and is provided with a handle or arm 44. By turning the handle 44 the shaft 42 and arm 43 are also turned and the chain 37 is correspondingly moved. Motion in the chain 37 is communicated through the sprocket-wheels 36 to the gears 34 and thence to the segments 31 and wheels 30. The movement thus given to the wheels 30 turns them on the pivots 32 and acts to steer the vehicle in the direction desired. One advantage derived from moving the wheels 30 about pivots near their hubs is that the force required at the handle 44 to maintain the wheels in a given direction is less when so pivoted than when pivoted on a king-bolt at the center in the ordinary manner. Another advantage is that for a given turning of the vehicle such pivoting requires a less displacement of the wheels 30 from their normal position.

What I claim is—

1. In an automobile, a pair of driving-wheels mounted upon independently-movable shafts, a pair of independently-movable motors supported within the body of the vehicle, independent connections from the motors to the respective wheel-shafts, means for inclosing the motors so as to separate them from the carrying-space in the vehicle, separate means for inclosing the wheel-shafts, and a separate inclosing device for each of the independent connections from the motors to the wheel-shafts.

2. In an automobile, a pair of independent motors supported within the body of the vehicle and separated from the carrying-space thereof, connections from said motors to the shafts of independent wheels, a casing inclosing the shafts, and flexible casings surrounding the connections from the motors to the shafts and extending from the body of the vehicle to the casing for the shafts.

3. In the steering mechanism for an automobile, a pair of wheels each of which is movable about a pivot at right angles to its axis, a gear-segment and a gear for each wheel for so moving it, a sprocket-wheel connected to each gear, a chain connecting the two sprocket-wheels and serving to move them in unison, and a handle and connections by which said chain may be moved.

4. In the steering mechanism for automobiles, the combination with a pair of wheels each of which is movable about a pivot adjacent to the wheel and at right angles to its axis, of a sprocket-wheel for each wheel of the pair of wheels, a chain connecting said sprocket-wheels, and a handle provided with connections for moving said chain, substantially as described.

Signed by me at Chicago, Illinois, this 21st day of October, 1899.

FREDERICK G. FRANKENBERG.

Witnesses:
RHODA E. SMALE,
WILLIAM A. SHARP.